INVENTOR:
ALLAN N. GREENWOOD,
BY William Freedman
ATTORNEY

United States Patent Office 3,435,288
Patented Mar. 25, 1969

3,435,288
CIRCUIT INTERRUPTING MEANS FOR A HIGH VOLTAGE D-C CIRCUIT
Allan N. Greenwood, Media, Pa., assignor to General Electric Company, a corporation of New York
Filed Mar. 10, 1966, Ser. No. 533,366
Int. Cl. H02h 3/20
U.S. Cl. 317—11    6 Claims

ABSTRACT OF THE DISCLOSURE

Discloses a high voltage D.C. circuit breaker in which a current zero is created by discharging a commutating capacitor through a circuit interrupting device. The capacitor and normally-open circuit-making means are connected in series across the interrupting device, with the capacitor connected to the D.C. circuit at the source side of the interrupting device even when the circuit-making means is open. The capacitor is charged directly from the source of the D.C. circuit through a charging circuit comprising a resistor connected between a terminal of the source and the juncture of the commutating capacitor and the circuitmaking means.

---

Figure 1:
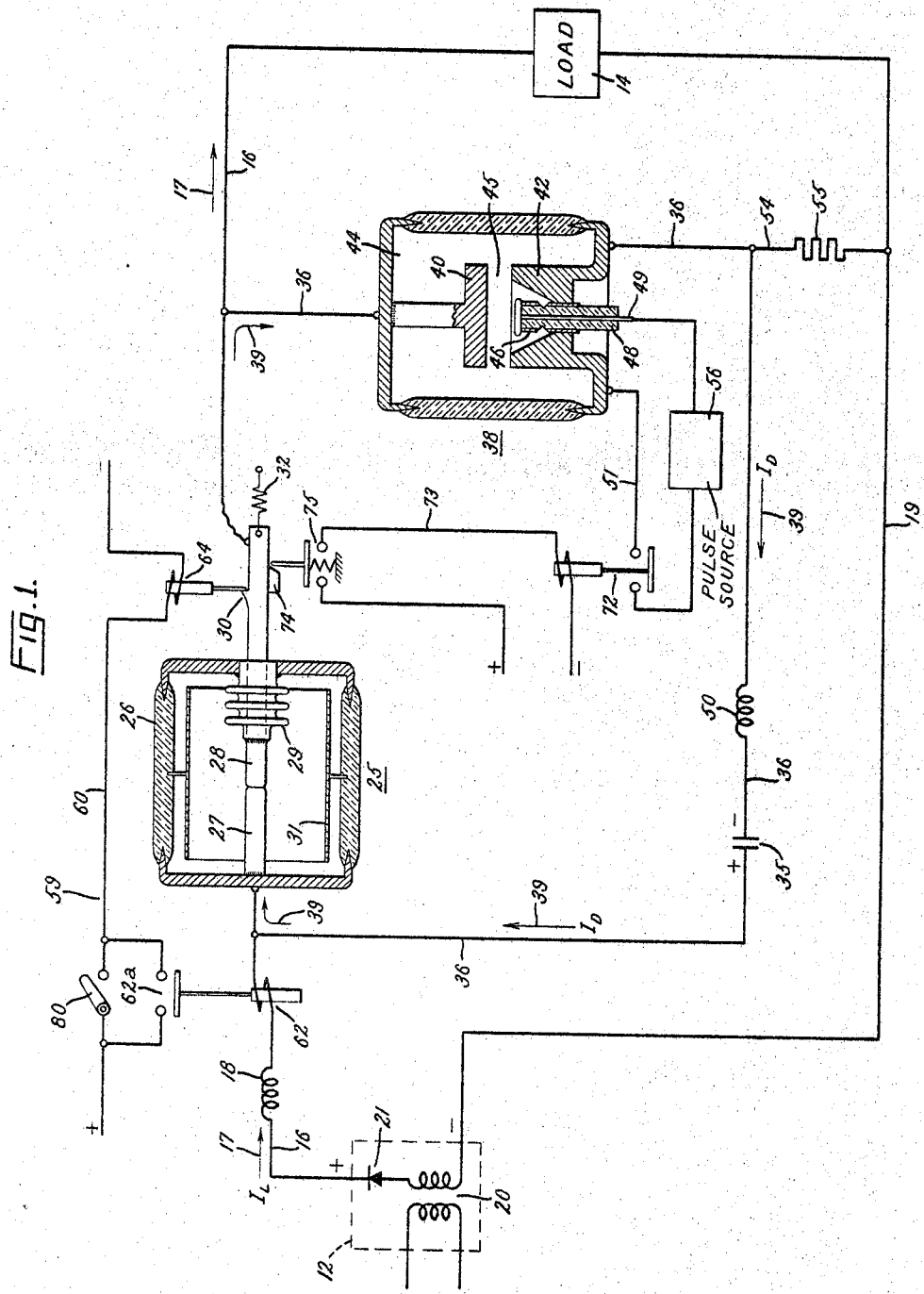

This invention relates to means for interrupting a high voltage direct-current circuit and relates more particularly to circuit interrupting means of the type in which a current zero is created by discharging a commutating capacitor through a circuit interrupting device.

In the particular circuit interrupting means that I am concerned with, a circuit interrupting unit, hereinafter referred to as an interrupter, is connected in series with a high voltage direct-current circuit that supplies current through the interrupter to a load. Connected across the interrupter is a normally-open commutating circuit that includes a precharged commutating capacitor. When the D-C circuit is to be opened, the capacitor is caused to discharge through the interrupter and the commutating circuit, thereby forcing the current through the interrupter to zero. The introduction of this current zero gives the interrupter an opportunity to build up dielectric strength and complete the interruption.

In most interrupting arrangements of this type previously proposed for high voltage applications, an item of major expense has been the charging means for the commutating capacitor. Such charging means has usually included a potential transformer rated for full line voltage, and such a transformer is quite expensive for power transmission voltages.

Schemes have been proposed which would allow the commutating capacitor to be charged directly from the power circuit without requiring such potential transformers, but such schemes have been relatively complex or have been subject to a number of other serious disadvantages. One of these disadvantages has been that the interrupter must be closed before the commutating capacitor can be charged. This has rendered the interrupter incapable of opening immediately following closing since considerable time was required to charge the commutating capacitor following interrupter-closing. Until this charging operation was substantially completed, the interrupter has had no interrupting ability and could therefore not be safely opened.

Another disadvantage of previously-proposed direct charging schemes has been that the circuit-making means which completes the commutating circuit has been required to interrupt considerable current. For example, in one such proposal, the load current has been diverted through such circuit-making means after the interrupter clears the circuit; and the circuit-making means has had to have sufficient interrupting ability to interrupt this current.

An object of my invention is to provide simple and relatively inexpensive means for interrupting a high voltage D-C circuit which requires no separate charging source for the commutating capacitor, yet has interrupting ability to perform an opening operation immediately following a closing operation if called upon to do so.

Still another object is to provide an interrupter of this type in which the circuit-making means for the commutating circuit is not required to have any appreciable current-interrupting ability.

In carrying out my invention in one form, I provide means for interrupting a D-C circuit that comprises a D-C source having first and second terminals and a load connected across the terminals. The interrupting means comprises an interrupting device connected in series with the load and located in the D-C circuit between said first terminal of the source and said load. Means is provided for normally maintaining the interrupting device in a condition that permits load current to flow therethrough. Connected across the interrupting device is a normally-open commutating circuit comprising normally-open circuit-making means and a commutating capacitor connected in series relationship with each other. The commutating capacitor is connected to the D-C circuit at the source side of the interrupter even when the circuit-making means is open. For causing the capacitor to be charged from the source when the interrupting device is open, I provide a charging circuit in the form of a resistor connected between the second terminal of the source and the juncture of said commutating capacitor and said circuit-making means. For forcing the current through the interrupter to zero, I provide means for closing the circuit-making means to discharge the commutating capacitor through the interrupter.

For a better understanding of the invention, reference may be had to the following description taken in conjunction with the accompanying drawings, wherein:

FIG. 1 is a schematic showing of a circuit-interrupting arrangement embodying one form of my invention. The circuit-interrupting arrangement is shown in its normally-closed position.

Figure 2:
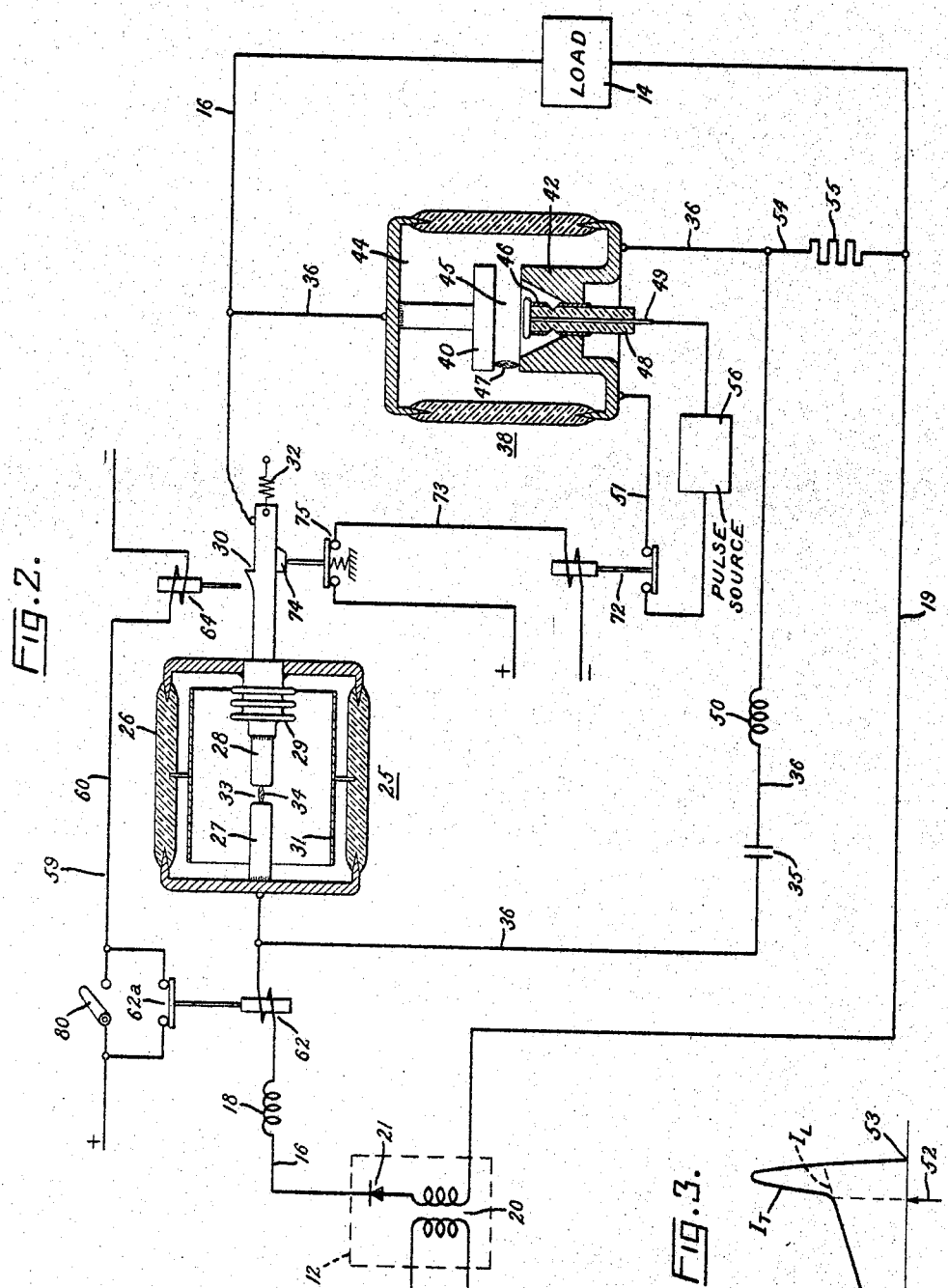

FIG. 2 schematically illustrates the circuit-interrupting arrangement of FIG. 1 during an interrupting operation.

Figure 3:
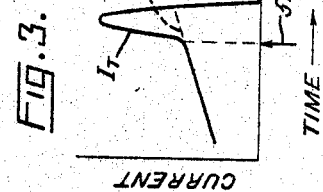

FIG. 3 is a graphical representation of the current flowing through the interrupting arrangement during an interrupting operation.

Referring now to FIG. 1, there is schematically shown a high voltage D-C circuit comprising a source 12, a load 14, and a power line 16 for delivering power to the load from the source. It will be assumed that the normal load current flows in the direction indicated by the arrows 17, returning to the source through a return conductor 19. The source 12 is schematically depicted as comprising a transformer 20 and a rectifier 21 connected in series with the secondary winding of the transformer. Connected in the power line 16 and in series with the source 12 and the load 14 is the usual smoothing reactor 18 which acts to smooth the current output from the source.

For controlling the flow of current to the load 14, a circuit interrupter 25 is connected in the power line 16 in series with the load 14 and the smoothing reactor 18. In a preferred embodiment of my invention, the circuit interrupter 25 is a vacuum-type circuit interrupter. As such, it comprises a highly evacuated envelope 26 partially of insulating material, and a pair of relatively-movable contacts 27 and 28 disposed within the evacuated envelope 26. The left-hand contact 27 is a stationary contact, and the right-hand contact 28 is a movable contact that projects through the right-hand end of the envelope 26. A suitable bellows 29 sealed at its respective opposite ends to the right-hand contact 28 and the envelope 26 permits the right-hand contact to move horizontally without impairing the vacuum inside the evacuated envelope 26.

The right-hand contact 28 is releasably held in its closed position of FIG. 1 by a suitable latch 30 and is biased to the right, or in an opening direction, by a suitable opening spring 32. When latch 30 is released, spring 32 drives movable contact 28 to the right to produce a gap 33 between the contacts, as shown in FIG. 2. This contact-separation establishes an arc 34 across the gap that is quickly extinguished and prevented from reigniting, thus interrupting the circuit, all in a manner soon to be explained in greater detail. For condensing the metallic vapors generated by the arc and for protecting the insulation of the envelope 26 from these vapors, a suitable metallic shield 31 of tubular configuration is provided inside the envelope.

The vacuum circuit interrupter 25 can be of a suitable conventional type and is therefore shown in schematic form only. Examples of vacuum-type circuit interrupters suitable for this application are shown in more detail and are claimed in U.S. Patents 2,949,520—Schneider and 3,089,936—Smith, both assigned to the assignee of the present invention.

It is considerably more difficult to interrupt direct current than alternating current because direct current contains no naturally-occurring current zeros. With alternating currents, current zeroes occur naturally; and to interrupt such currents, it is only necessary to prevent reignition of the arc after a natural current zero. But with direct current, it is necessary first to force the current to zero and then to prevent arc-reignition.

One way of forcing the current to zero is by forcing a locally-controlled current through the interrupter in opposition to the load current flowing therethrough. This is the general approach used in the illustrated interrupting arrangement, where the opposing current is derived from a commutating capacitor 35. As will soon be explained in more detail, this capacitor 35 is precharged with the polarity shown in FIG. 1. The capacitor 35 is located in a commutating or arc-quenching circuit 36 that is connected across the contacts 27, 28 of the interrupter 25. The commutating or arc-quenching circuit 36 is normally maintained in an open condition by normally-open circuit-making means 38 connected in series with the commutating capacitor 35. When the circuit-making means 38 is closed, as will soon be explained, commutating capacitor 35 discharges through a loop circuit that comprises the series combination of the contacts 27, 28 of the interrupter 25 and the arc-quencing circuit 36. The capacitor discharge current $I_D$ initially flows through loop circuit 27, 28, 36 in the direction illustrated by arrows 39.

This loop circuit 27, 28, 36 is an oscillatory circuit, the capacitance of which is constituted primarily by capacitor 35 and the inductance of which can be represented by an inductance 50. The discharge current is a relatively high frequency oscillatory current that is superimposed on the current $I_L$ flowing through the power line 16. This relationship is illustrated in FIG. 3, where the total current flowing through the interrupter is illustrated by the curve $I_T$. When the capacitor initially discharges, beginning at an instant 52, the discharge current $I_D$ rapidly builds up to a positive peak and then oscillates toward a negative peak. This oscillation toward the negative peak results in capacitor discharge current being forced through the interrupter 25 in opposition to the current $I_L$, thereby driving the total current $I_T$ to zero at an instant 53 in FIG. 3.

In a preferred form of the invention, circuit interruption is effected by first separating the contacts 27 and 28 to draw an arc therebetween, as shown in FIG. 2. At a predetermined instant thereafter, the circuit-making means 38 is effectively closed to complete the commutating circuit 36, as shown in FIG. 2. This forces the oscillatory discharge current $I_D$ through the commutating circuit 36 and the interrupter 25, thus forcing the total current to zero, as illustrated in FIG. 3 and described hereinabove. When this total current is forced to zero, the arc between the contacts is extinguished.

Interruption is successfully completed if the gap 33 that is then present between the contacts 27, 28 can successfully withstand the recovery voltage that is quickly built up across the gap when the current zero point is reached. The illustrated interrupter, being a vacuum interrupter, can build up dielectric strength across the gap at an extremely rapid rate when the arc is extinguished at current zero. This enables the interrupter to successfully withstand the recovery voltage transient, thereby interrupting the circuit.

The normally-open circuit-making means 38 is preferably a triggered vacuum gap of the general type shown and claimed in U.S. Patent 3,087,092—Lafferty, assigned to the assignee of the present invention. Such a gap comprises a pair of spaced-apart main electrodes 40 and 42 disposed in a highly evacuated chamber 44 and defining a main gap 45 therebetween. Disposed adjacent one main electrode 42 is a trigger electrode 46 defined by a hydrogen-impregnated titanium film on a ceramic supporting rod 48. This ceramic supporting rod 48 is disposed coaxially of the main electrode 42 and is suitably sealed to the main electrode 42 about its outer periphery. A portion of the ceramic supporting rod 48 is uncoated and defines a trigger gap along this uncoated surface that electrically isolates the trigger electrode 46 from the main electrode 42 under normal conditions. A conductive connection 49 extends through the ceramic rod 48 and across its upper end surface to the trigger electrode 46.

When an electric pulse is applied between the trigger electrode 46 and the main electrode 42, the trigger gap breaks down, and the resultant spark liberates a small quantity of hydrogen from the hydrogen-impregnated trigger electrode 46. This hydrogen is quickly ionized and projected into the main gap 45, thus lowering its dielectric strength and initiating a breakdown of the main gap. The arc established between electrodes 40, 42 upon breakdown of main gap 45 is illustrated at 47. When the main gap 45 thus breaks down, the commutating capacitor 35 can discharge through the commutating circuit 36 via arc 47 in the manner described hereinabove to force the current through the main interrupting device 25 to zero.

When the current in the commutating circuit 36 finally reaches zero, as will soon be explained, a high dielectric strength is automatically established across the main gap 45 of gap device 38, and the gap device is thus restored to its original normally-open condition.

The above-described pulse across the trigger gap is derived from any suitable conventional pulse source such as schematically shown at 56 connected in a pulse circuit 49, 51 that extends between the trigger electrode and the main electrode. This pulse source 56 is rendered operative by a suitable switching device 72 which operates to complete the pulse circuit 49, 51 in response to completion of a control circuit 73. This control circuit 73 is completed in response to the movable contact 28 of the interrupter 25 reaching a predetermined point in its opening stroke. At this predetermined point, a cam 74 on the movable contact 28 closes a normally-open switch 75, thereby completing control circuit 73, thus causing the trigger pulse to be applied to the trigger gap and close the circuit-making means 38. FIG. 2 illustrates the position of the parts after the switch 75 has been closed to cause a pulse from source 56 to initiate breakdown of the gap device 38.

Although I prefer to use a triggered vacuum gap device for circuit-making means 38, it will be apparent that other forms of switching devices could instead be used. For example, I could use a normally-open switch provided with suitable means for operating its contacts to closed position when the interrupter 25 has been opened to a predetermined extent and for subsequently separating said contacts after the interrupter operation had been completed.

Previously-proposed high voltage interrupting arrangements that have used a commutating capacitor have either required separate charging sources for the capacitor or have been subject to one or more of the disadvantages set forth in the introductory portion of this specification. In the illustrated embodiment, I charge my commutating capacitor 35 directly from the power lines 16 without relying upon a separate charging source. In this regard, I connect my commutating capacitor to the power line 16 at the source side of the interrupter 25, and I provide a charging circuit 54 that is connected between the juncture of capacitor 35 and the circuit making means 38 and the return conductor 19 of the power circuit. This return conductor 19 can be considered as the negative terminal of the source 12.

This charging circuit 54 comprises a resistance 55 of a relatively high value. Irrespective of whether the interrupter 25 is closed or open, the charging circuit 54 connects the series combination of the commutating capacitor 35 and the resistor 55 across the terminals of the source 12. As a result of this connection, the source 12 can charge the capacitor 35 to full line voltage with a charge of the polarity shown whether the interrupter 25 is open or closed (assuming the circuit-making means 38 is opened).

Since the commutating capacitor 35 is charged from the source 12 when the interrupter 25 is open, it is possible to close the interrupter 25 with assurance that the interrupter can immediately open to interrupt the circuit should this be necessary, say, as a result of a fault being present. In most prior interrupter arrangements where the commutating capacitor is directly charged from the source, charging could take place only when the interrupter was closed, and it was necessary to delay any opening operation until such charging could be completed following a closing operation. I am able to eliminate this delay.

Another significant advantage of my interrupting arrangement is that the circuit-making means 38 is not called upon to interrupt any substantial amount of current incident to the interrupting operation. In this connection, note that when the interrupter 25 is open, as shown in FIG. 2, it effectively isolates the circuit-making means from the source 12 and thus prevents current from the source from flowing through the circuit-making means. The circuit making means 38 is connected in series with the resistor 55 across the load 14, and any energy stored in this portion of the load circuit can be dissipated through the series combination of the resistor 55 and the then conductive circuit-making means 38. When this energy has been dissipated, the current through circuit making means 38 reaches zero and the circuit-making means quickly recovers its original dielectric strength. Since the current naturally falls to zero and does not tend to persist, the circuit-making means 38 need have no self-clearing abilities.

The resistor 55 should be of a relatively high value in order to prevent the commutating capacitor 35 from discharging too quickly should a fault develop between lines 16 and 19 at a point close to the interrupting device 25. In this respect, a fault of such a character, assumed to be located downstream from the interrupting arrangement, would connect the resistor 55 across the capacitor terminals and cause the capacitor 35 to begin discharging through resistor 55. If the discharging capacitor 35 lost an excessive portion of its initial charge prior to closing of circuit-making device 38, it would be ineffective to provide the desired commutating current when the circuit-making means 38 was closed. Generally speaking, I therefore use a resistor 55 of a high enough resistance to maintain this charge on the capacitor 35 at a value of at least about 80% of its initial value until the circuit-making device 38 is closed. This resistance is high enough to maintain the charge at this high level even if it is a short circuit between lines 16 and 19 near the interrupter that initiates operation of the interrupter. Preferably, 95 percent or more of the initial charge is maintained during this period.

In one embodiment of the invention, I use a resistor 55 of 0.1 megohm, a capacitor 35 of 4 microfarads, and a source voltage of 20 kv. These figures are given by way of example and not limitation.

For initiating an opening operation, a conventional control circuit 59 shown in simplified schematic form is provided. Referring to FIG. 1, the control circuit 59 comprises a conductor 60 extending from the positive to the negative terminals of a control-voltage source through the normally-open contacts 62a of an overcurrent-responsive relay 62 and the coil of a tripping solenoid 64, which controls the latch 30. When the current in power line 16 exceeds a predetermined value, relay 62 picks up, closing its contacts 62a to complete an energizing circuit for solenoid 64. The solenoid responds by tripping latch 30 to cause opening of interrupter 25.

This opening operation can be initiated at will, instead of in response to an overcurrent, simply by manually closing a switch 80 in parallel with the normally-open contacts of the over-current-responsive relay 62. This completes the trip circuit 59 to initiate an opening operation in the same manner as above-described.

Although I prefer to use a vacuum interrupter for the main interrupting element 25 of my D.C. interrupting arrangement, it is to be understood that my invention in its broader aspects comprehends the use of other types of switching devices, such as silicon controlled rectifiers.

Although I have shown a single-break vacuum interrupter being used as the main interrupting element 25, it is to be understood that for high voltage applications, a number of these units must be connected in series to withstand the high voltages involved. My invention therefore comprehends an arrangement in which the main interrupter comprises a plurality of interrupting units connected in series for substantially simultaneous opening and for substantially simultaneous closing. Similarly, the circuit-making means 38 can include a plurality of units connected in series to withstand the high voltages involved in high voltage applications.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. Means for interrupting a direct-current circuit that comprises a D-C source having a pair of terminals and a load connected across said terminals, comprising:
   (a) a pair of separable contacts connected in series with said load and located between a first terminal of said source and said load,
   (b) means for normally maintaining said contacts in engagement to enable the load current to flow therethrough,
   (c) a normally-open commutating circuit connected across said contacts and comprising normally-open circuit-making means and a commutating capacitor connected in series-circuit relationship with each other,
   (d) said commutating capacitor being connected to said D-C circuit at the source side of said contacts even when said circuit-making means is opened,
   (e) means operable both when said contacts are engaged and disengaged for causing said capacitor to be charged from said source when said circuit-making means is open, comprising resistance means connected between the juncture of said capacitor and said circuit-making means and a second terminal of said source, (f) means for separating said contacts to draw an arc therebetween, (g) means for forcing the current through said interrupter to zero comprising means for closing said circuit-making means upon establishment of said arc to discharge said commutating capacitor through said arc.

2. The circuit interrupting means of claim 1 in which: said separable contacts are located between said source and said circuit-making means, thereby preventing current from flowing through said circuit-making means from said source when said contacts are open.

3. The circuit interrupting means of claim 1 in which said resistance means and said circuit-making means are connected in a series circuit between the load side of said interrupter and said second terminal of said source.

4. The circuit interrupting means of claim 1 in which said capacitor is charged with a polarity that causes discharge current from said capacitor to flow through said arc in the same direction as the load current initially upon closure of said circuit-making means.

5. Means for interrupting a D-C circuit that comprises a D-C source having first and second terminals and a load connected across said terminals, comprising:

(a) a switching device connected in series with said load and located in said D-C circuit between said first terminal of said source and said load, (b) means for normally maintaining said switching device in a condition that permits load current to flow therethrough, (c) a normally-open commutating circuit connected across said switching device and comprising normally-open circuit-making means and a commutating capacitor connected in series relationship with each other, (d) said commutating capacitor being connected to said D-C circuit at the source side of said switching device even when said circuit-making means is open, (e) means operable both when said switching device is in a conducting and a non-conducting condition for causing said capacitor to be charged from said source when said circuit-making means is open comprising resistance means connected between said second terminal of said source and the juncture of said capacitor and said circuit-making means, and (f) means for forcing the current through said switching device to zero comprising means for closing said circuit-making means to discharge said commutating capacitor through said switching device.

6. The circuit interrupting means of claim 5 in which said resistance means has a high enough resistance to maintain the charge on said capacitor at a value of at least about 80 percent of its initial value until said circuit-making means closes, even in the event of a short circuit developing across said load near said interrupting means just prior to operation of the interrupting means.

References Cited

UNITED STATES PATENTS 2,789,253    4/1957    Vang ---------------- 317—11
3,252,050    5/1966    Lee ----------------- 317—11

LEE T. HIX, *Primary Examiner.*

J. D. TRAMMELL, *Assistant Examiner.*

U.S. Cl. X.R.

307—136